US009001337B2

(12) United States Patent
Goto et al.

(10) Patent No.: US 9,001,337 B2
(45) Date of Patent: Apr. 7, 2015

(54) ETCHING MONITOR DEVICE

(71) Applicant: Shimadzu Corporation, Kyoto-shi, Kyoto (JP)

(72) Inventors: Hiroomi Goto, Kyoto (JP); Yuzo Nagumo, Kyoto (JP); Rui Kato, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 6 days.

(21) Appl. No.: 13/889,818

(22) Filed: May 8, 2013

(65) Prior Publication Data

US 2013/0314692 A1 Nov. 28, 2013

(30) Foreign Application Priority Data

May 18, 2012 (JP) ................................ 2012-114577

(51) Int. Cl.
*G01B 11/02* (2006.01)
*G01B 11/22* (2006.01)
*G01B 11/06* (2006.01)

(52) U.S. Cl.
CPC ............ *G01B 11/22* (2013.01); *G01B 11/0675* (2013.01); *G01B 11/0625* (2013.01)

(58) Field of Classification Search
CPC ........... G01B 11/0625; G01B 11/0675; G01B 11/22; G01C 3/08
USPC .................................................. 356/503, 504
See application file for complete search history.

(56) References Cited

U.S. PATENT DOCUMENTS

| 4,767,495 | A | * | 8/1988 | Nishioka ........................ 216/60 |
| 6,589,869 | B2 | | 7/2003 | Sarfaty et al. |
| 6,815,228 | B2 | | 11/2004 | Usui et al. |
| 6,903,826 | B2 | | 6/2005 | Usui et al. |
| 6,950,193 | B1 | * | 9/2005 | Discenzo ....................... 356/503 |
| 7,009,714 | B2 | | 3/2006 | Ohmoto et al. |
| 7,009,715 | B2 | | 3/2006 | Usui et al. |
| 7,259,866 | B2 | | 8/2007 | Usui et al. |
| 7,301,645 | B2 | * | 11/2007 | Wang et al. .................... 356/503 |
| 7,652,774 | B2 | * | 1/2010 | Lian et al. ...................... 356/503 |

FOREIGN PATENT DOCUMENTS

| JP | 10-325708 A | 12/1998 |
| JP | 2000-292129 A | 10/2000 |
| JP | 2004-253516 A | 9/2004 |
| JP | 2009-156876 A | 7/2009 |
| JP | 2009-164445 A | 7/2009 |

* cited by examiner

*Primary Examiner* — Michael A Lyons
(74) *Attorney, Agent, or Firm* — Sughrue Mion, PLLC (57) ABSTRACT

An etching monitor device capable of high precision measurement in the presence of a mask region capable of producing interference. The device including an interference optical system which acquires reflected interference light containing three interference component signals, which are due respectively to optical path differences of reflected light between three sets of surfaces. The three interference component signals include a first interference based on an optical path between light reflected off of a mask surface and light reflected off of a top surface of the substrate, a second interference based on an optical path between the light reflected off of the top surface of the substrate and light reflected off of a surface to be etched, and a third interference based on an optical path between the light reflected off of the surface to be etched and the light reflected off of the mask surface.

4 Claims, 8 Drawing Sheets

FIG. 14
Correction table

US 9,001,337 B2

ETCHING MONITOR DEVICE

TECHNICAL FIELD

The present invention relates to an etching monitor device which monitors etching depth, i.e. the level difference between the surface to be etched and the top surface of the substrate, in real time during an etching process.

BACKGROUND ART

When the desired grooves or holes are to be patterned on a semiconductor wafer or the like, an etching process is used wherein the top surface of the substrate (the top surface where etching is not going to be carried out) is covered with a mask (photoresist layer) to make a mask surface, leaving out the surface to be etched (the portion which will become a groove or hole), plasma is generated using etching gas, and etching is performed on the surface to be etched. In the etching process, it is necessary to monitor, in real time, the etching depth which changes over time, in order to process the surface to be etched to the desired depth.

In monitoring of etching depth, a method is employed which utilizes the interference of light due to difference in depth between the region covered by the mask and the region of the surface to be etched. The method most often used among monitoring methods which employ optical interference is a method whereby change over time of interference intensity accompanying change in etching depth is monitored by projecting a single-wavelength light, and the etching depth is measured by counting the waves with maxima and minima of interference intensity (see Patent Literatures 1 through 4). A monitoring method utilizing change over time of interference intensity accompanying change in etching depth indicated by single-wavelength light will be referred to hereinafter as a "change-over-time monitoring method."

Furthermore, as another monitoring method utilizing interference light, a method has been disclosed wherein light having a certain wavelength bandwidth (wavelength band) is projected, and the reflected interference spectrum is utilized. For example, a method has been disclosed wherein a model predicted spectrum (theoretical value), predicted from a reflection model of a wafer surface film, is computed in advance, and monitoring is performed through spectrum fitting (curve fitting) with actual measurement results of the reflected interference light spectrum (Patent Literature 5). A monitoring method which utilizes spectral interference indicated by a spectrum having a certain wavelength bandwidth will be referred to hereinafter as a "spectral interference method."

PRIOR ART LITERATURES (Patent literature 1) Japanese Unexamined Patent Application Publication 2009-164445
(Patent literature 2) Japanese Unexamined Patent Application Publication 2009-156876
(Patent literature 3) Japanese Unexamined Patent Application Publication 2000-292129
(Patent literature 4) Japanese Unexamined Patent Application Publication H10-325708
(Patent literature 5) Japanese Unexamined Patent Application Publication 2004-253516

SUMMARY OF THE INVENTION

In monitoring of etching depth using light interference, if a photoresist mask region is present, two optical paths with very close periods (periods of change over time or periods of spectral interference fringes) will be present in the change over time of interference or the spectral interference fringes used for monitoring, and the ambiguity of measurement which arises as a result poses a problem. This phenomenon will be explained below.

DETAILED DESCRIPTION OF THE EXEMPLARY EMBODIMENTS

Figure 3:
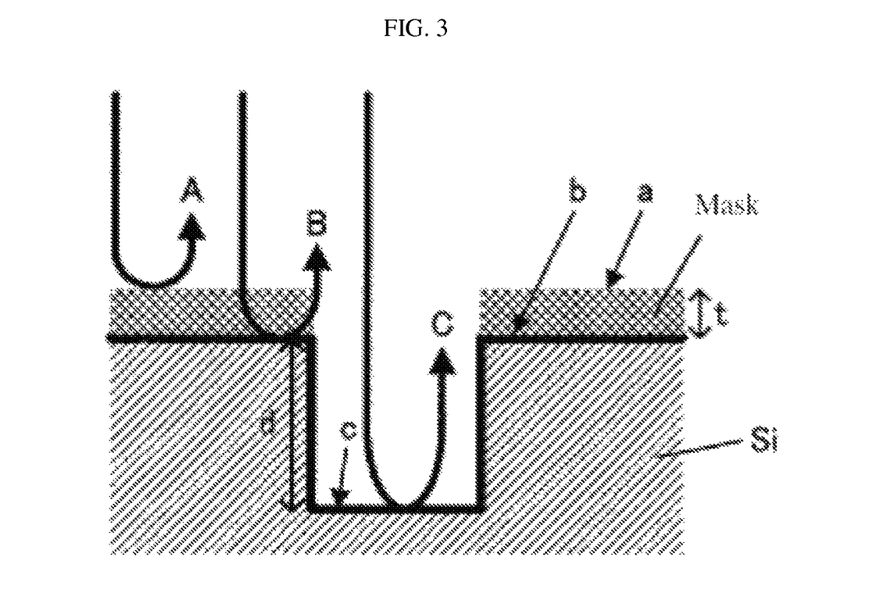
FIG. 3 A drawing showing the cross-section of the processed region of a substrate and the state of reflection of interference light.

FIG. 3 is a cross-section wherein a mask surface a where the substrate top surface b is covered with a mask and an etched surface c which is not covered with a mask have been formed, showing the state of reflection of light when interference is measured for a specimen (Si substrate) having an etching depth d (μm) and a mask thickness t (μm). With regard to light reflected from the specimen, three reflected lights are observed: mask top surface reflection A (referred to as reflection A), substrate top surface (more accurately, mask/substrate interface) reflection B (referred to as reflection B) and etched surface reflection C (referred to as reflection C).

Taking reflection A as reference, the optical path length (optical path difference) of the reflected lights, assuming n to be the refractive index of the mask material, is 0 for reflection A, 2 nt for reflection B and 2(d+t) for reflection C. The respective reflected lights, taking their amplitudes to be A, B and C respectively, are represented by the following formulas (1) through (3).

$$A: A\exp(kX+\omega T+0/\lambda*2\pi) \quad (1)$$

$$B: B\exp(kX+\omega T+2nt/\lambda*2\pi) \quad (2)$$

$$C: C\exp(kX+\omega T+2(d+t)/\lambda*2\pi) \quad (3)$$

Here, k is wavenumber, X is location, $\omega$ is frequency and T is time.

The intensities of the reflected lights added together are represented by the following formula (4).

$$|A + B + C|^2 = \quad (4)$$
$$|A\exp(kX + \omega T + 0/\lambda*2\pi) + B\exp(kX + \omega T + 2nt/\lambda*2\pi) +$$
$$C\exp(kX + \omega T + 2(d + t)/\lambda*2\pi)|^2 =$$
$$A + B + C + 2AB\cos(2nt/\lambda*2\pi) +$$
$$2BC\cos(2(d + t\text{-}nt)/\lambda*2\pi) + 2CA\cos(2(d + t)/\lambda*2\pi)$$

From formula (4), it can be seen that three cos function (cosine function) interference components appear in the spectrum: A-B interference (interference due to surface a and surface b), B-C interference (interference due to surface b and surface c) and C-A interference (interference due to surface c and surface a).

Among these three interference components, the phases of two cos components, i.e. B-C interference and C-A interference, are extremely close to each other, the difference between them being $-nt$. Here, the mask thickness t, when compared to the etching depth d, has smaller change over time during etching and also has a smaller absolute value. This fact has an adverse effect on the monitoring of etching depth using optical interference. The problems affecting the <1> change-over-time monitoring method and <2> spectral interference method will be discussed below.

<1> Problems Relating to the Change-Over-Time Monitoring Method

Generally, mask material is etched at a very slow rate (has a larger selection ratio) as compared to the material to be etched, and there is hardly any difference (the difference of nt is very small) in the increase or decrease of interference intensity at a given wavelength for B-C interference and C-A interference. Thus, the change over time constitutes two interference beat components, and it is difficult to accurately ascertain the etching depth on this basis. A more specific example is presented below.

For example, assuming the selection ratio of mask surface a and etched surface c to be 20, while the material to be etched is etched to d ($\mu$m), the mask thickness t will be reduced by d/20 ($\mu$m). Assuming the refractive index of the mask material is n=1.5 and the initial mask thickness before start of etching is t0, $$t=t0-d/20$$

is substituted into the interference terms of formula (4).

The interference terms of formula (4) are represented by formulas (5) through (7).

$$A\text{-}B \text{ interference: } AB\cos(0.15d/\lambda*2\pi+3t0/\lambda*2\pi) \quad (5)$$

$$B\text{-}C \text{ interference: } BC\cos(1.95d/\lambda*2\pi+t0/\lambda*2\pi) \quad (6)$$

$$C\text{-}A \text{ interference: } CA\cos(2.1d/\lambda*2\pi+2t0/\lambda*2\pi) \quad (7)$$

Based on formulas (6) and (7), for B-C interference and C-A interference, the change of the phase component of the cos function in relation to the advancement of the etching depth d is very similar (the period of increase/decrease is very similar), and thus it is very difficult to independently read these two phase changes. This point will be explained further using the drawings.

It will be assumed that the amplitudes (intensities) A, B and C of reflected light of reflections A, B and C are proportional to the surface area of the respective regions. Since the surface area of the etched surface c (aperture percentage) is generally small compared to the measurement surface area, it is assumed that the reflected light amplitude (intensity) is $$A \text{ or } B >> C.$$

Figure 4:
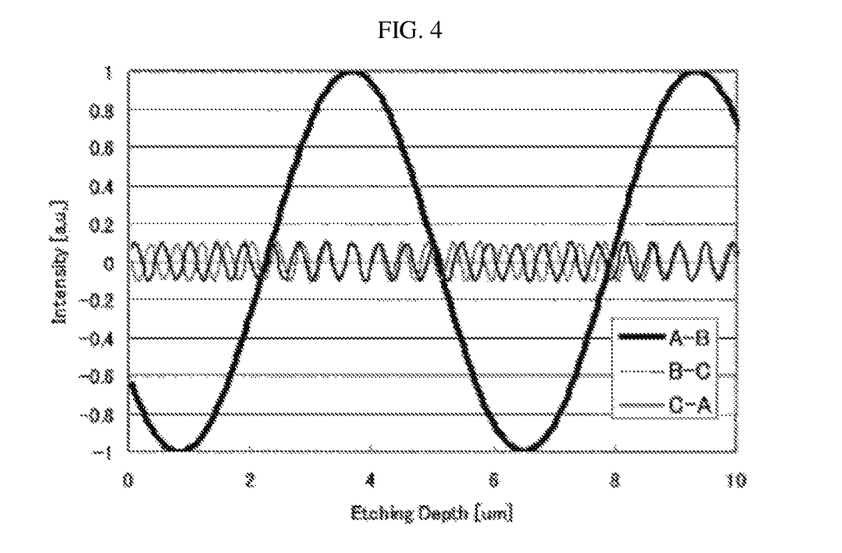
FIG. 4 A drawing showing change over time of three reflected interference lights when measuring the processed region of the substrate using a light source with a wavelength of 850 nm.

An example of change over time of the interference components for A-B interference, B-C interference and C-A interference is shown in FIG. 4. FIG. 4 is the result of simulation of change over time of reflected light intensity when the mask surface and the surface to be etched are etched, using 0.85 $\mu$m wavelength light, wherein three separate reflected interference lights are shown. It will be noted that the horizontal axis is the time axis, but on the assumption that the etching depth is proportional to time, the horizontal axis has been labeled as "etching depth" (likewise for FIG. 5 and FIG. 6, described below).

As obtained from formulas (5) through (7), the period of increase/decrease of the interferences has the following numerical values, with the periods of B-C interference and C-A interference being very close to each other.

$$A\text{-}B \text{ interference: } \lambda/0.15=5.67 \, \mu\text{m}$$

$$B\text{-}C \text{ interference: } \lambda/1.95=0.44 \, \mu\text{m}$$

$$C\text{-}A \text{ interference: } \lambda/2.1=0.40 \, \mu\text{m}$$

Figure 5:
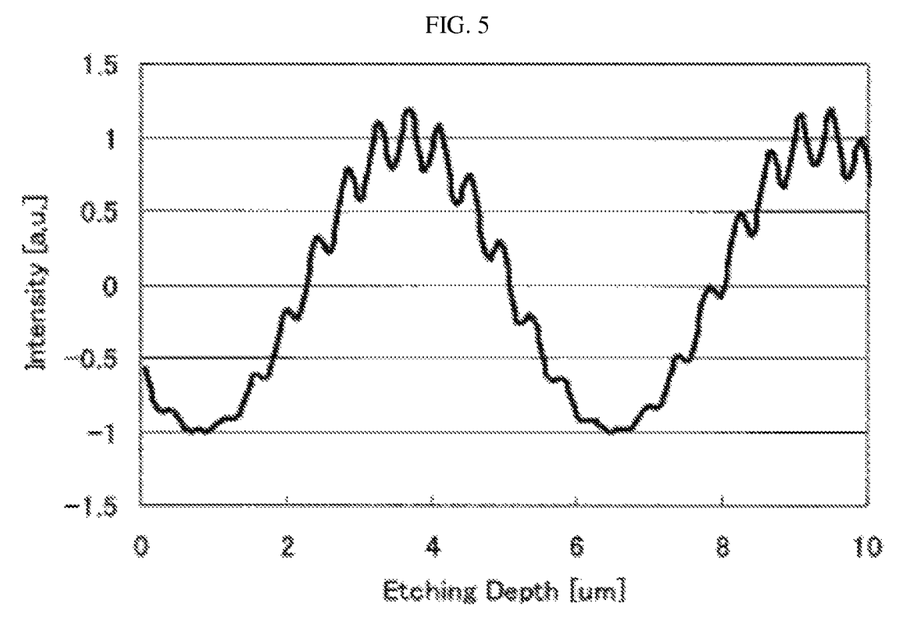
FIG. 5 A drawing in which the three reflected interference lights of FIG. 4 have been summed.

FIG. 5 is change-over-time data in which all three interference components have been summed. Change-over-time data with a complex shape is obtained, wherein the small amplitude interference from B-C interference and C-A interference is overlaid onto the large amplitude interference from A-B interference.

Figure 6:
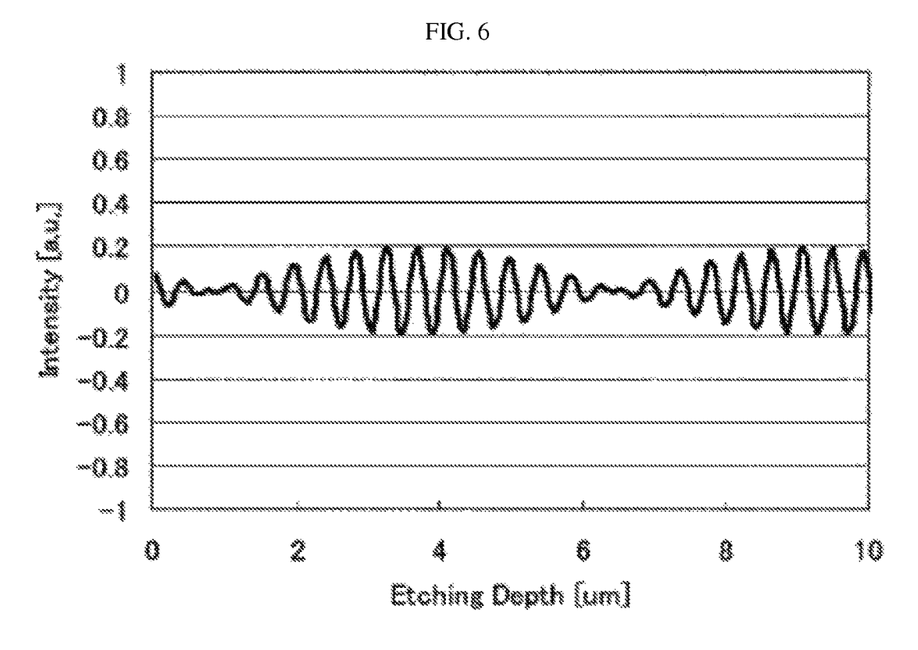
FIG. 6 A drawing in which only B-C interference and C-A interference of FIG. 4 have been summed.

FIG. 6 is change-over-time data in which the interference terms due to the surface to be etched (B-C interference and C-A interference) have been extracted, excluding only the variation (A-B interference) due to the mask region, which is the largest amplitude component among the three interference components. In this way, even if the A-B interference can be eliminated, the increasing/decreasing change will be a beat component in which two interferences of very similar period are summed together. It can be seen that in the waveform of the beat component, the node areas (areas with small amplitude) are partially squashed, and thus, it is difficult to accurately obtain a count of maxima and minima and phase information, so accurately deriving the etching depth is in principle very difficult.

<2> Problems Relating to the Spectral Interference Method

Generally, the mask thickness t is very small (the optical path length is short) as compared to the etching depth d, so there is hardly any difference in the frequency of spectral interference fringes between B-C interference and C-A interference (the nt optical path difference is very small). Thus, it is very difficult to perform spectral analysis. This will be illustrated through a more specific example below.

For example, when the mask thickness is 2 $\mu$m and the depth of the material to be etched is 50 $\mu$m, assuming the refractive index of the mask material n=1.5 and substituting into the interference terms of formula (4), the interference components can be represented by the following formulas (8) through (10).

$$A\text{-}B \text{ interference: } AB \cos(6/\lambda * 2\pi) \quad (8)$$

$$B\text{-}C \text{ interference: } BC \cos(98/\lambda * 2\pi) \quad (9)$$

$$C\text{-}A \text{ interference: } CA \cos(104/\lambda * 2\pi) \quad (10)$$

Based on formulas (9) and (10), for B-C interference and C-A interference, the change in the phase component of the cos function with respect to the wavelength axis direction is very similar (the frequencies are similar), so it is very difficult to independently read the two frequencies. This point will be explained using the drawings.

Figure 7:
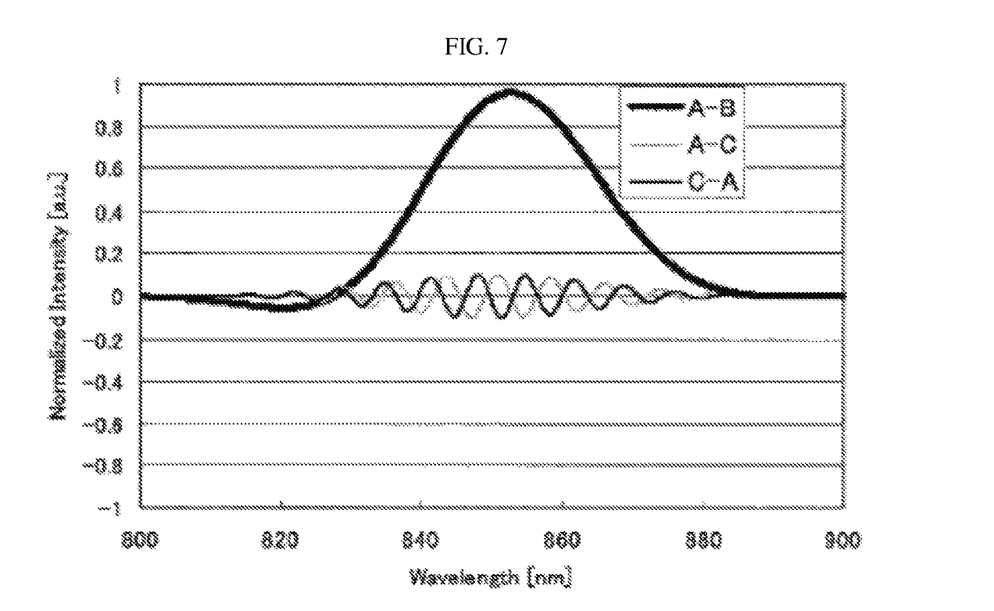
FIG. 7 A drawing of the spectrum of two reflected interference lights when measuring the processed region of the substrate using a light source with a spectrum centered on a wavelength of 850 nm and having a wavelength band of 15 nm full width at half maximum.

Spectral interference fringes were computed through simulation in the same manner as for the change-over-time monitoring method of <1> above. FIG. 7 is the result of simulation assuming a light source having a spectrum centered on a wavelength of 0.85 μm with a wavelength band of 15 nm full width at half maximum and assuming a mask thickness of 2 μm and a depth of the material to be etched of 50 μm, being spectral data wherein three individual reflected interference lights are shown.

As obtained from formulas (8) through (10), the periods of the interference fringes have the following numerical values in the region of wavenumber ($\omega=1/\lambda$ (nm$^{-1}$)), with the periods of B-C interference and C-A interference being very close to each other.

$$A\text{-}B \text{ interference: } 1/6 = 0.1667 \text{ nm}^{-1}$$

$$B\text{-}C \text{ interference: } 1/98 = 0.0102 \text{ nm}^{-1}$$

$$C\text{-}A \text{ interference: } 1/104 = 0.0096 \text{ nm}^{-1}$$

Figure 8:
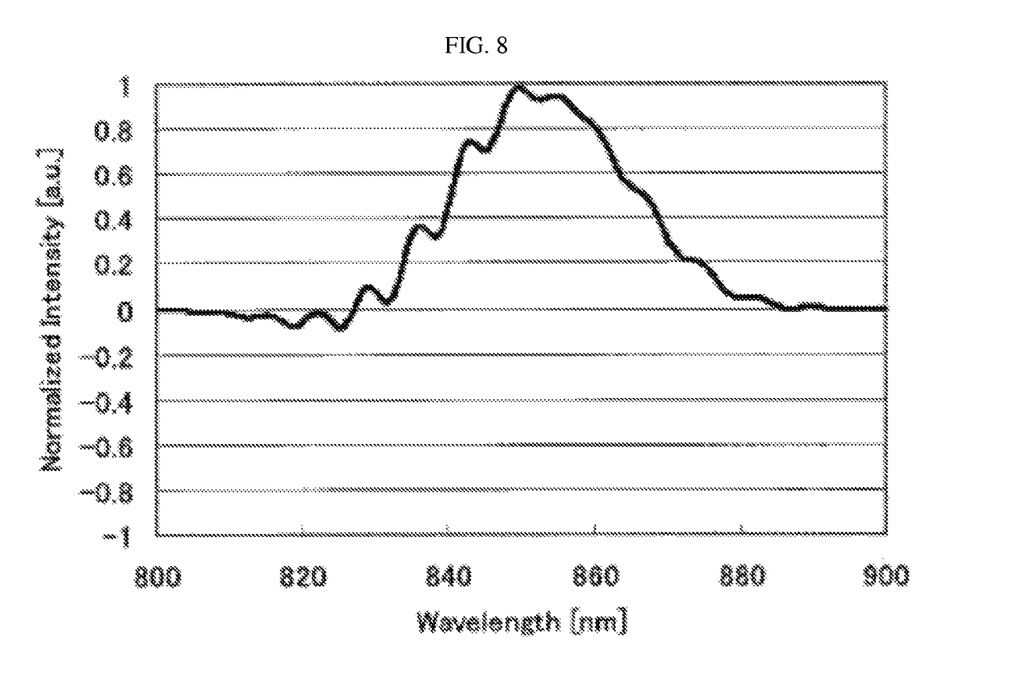
FIG. 8 A drawing in which the three reflected interference lights of FIG. 7 have been summed.

FIG. 8 is spectrum data in which all three interference components have been summed. Spectral data is obtained with a complex shape in which small amplitude interference from B-C interference and C-A interference is overlaid onto large amplitude interference from A-B interference.

Figure 9:
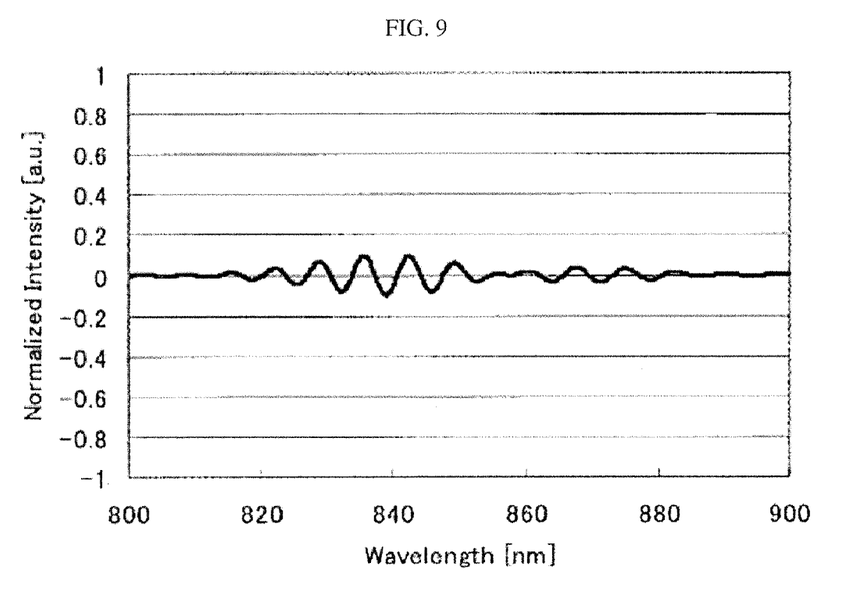
FIG. 9 A drawing in which B-C interference and C-A interference of FIG. 7 have been summed.

FIG. 9 is spectral data in which the interference terms due to the surface to be etched (B-C interference and C-A interference) have been extracted, excluding the variation (A-B interference) due to the mask region, which is the largest amplitude component among the three interference components. In this case, even if the A-B interference alone can be eliminated, the interference fringes will be a beat component in which two interferences of very similar period had been summed. A portion of the waveform of the beat component is squashed, and thus, it is in principle very difficult to derive the etching depth accurately through curve fitting with theoretical values.

In the curve fitting, if fitting is erroneously performed to a position offset by one period, the etching depth with be significantly misread, resulting necessarily in improper monitoring.

Furthermore, with measurement based on curve fitting, it is necessary to deal with an enormous amount of data in order to increase the fitting precision, and the calculations take time, resulting in a large computational load to perform the processing in real time, so there is the separate problem that a device having the corresponding processing capacity becomes necessary.

Based on the above, in techniques for monitoring etching depth which utilize optical interference, under the influence of the presence of two optical paths with very similar periods (periods of change over time or periods of spectral interference fringes) due to the presence of the mask region, beat-like changes appear, and ambiguity of measurement becomes a problem, especially in node areas.

It is thus an object of the present invention to provide an etching monitor device capable of measuring etching depth with high precision even in cases where two optical paths with very similar periods are present and ambiguity of measurement is generated due to the presence of a mask region which can produce interference.

The etching monitor device of the present invention, made to resolve the aforementioned problem, is an etching monitor device which monitors etching depth, which is a level difference between the surface to be etched and the top surface of the substrate in a processed region of a substrate containing a mask surface where the top surface of the substrate is covered with a mask and a surface to be etched, which is not covered by a mask, the device comprising: a light source which generates measurement light having a predetermined wavelength band; a measurement optical system which projects the measurement light onto the processed region of the substrate, and acquires reflected interference light containing three interference component signals for three types of interference, namely A-B interference, B-C interference and C-A interference, which are due respectively to optical path differences of reflected light between three sets of surfaces, namely, the mask surface and top surface of the substrate, the top surface of the substrate and the surface to be etched, and the surface to be etched and the mask surface; a spectrometric unit which chromatically disperses the reflected interference light and detects a reflected interference spectrum; an optical path difference analysis unit which performs extraction of interference component signals and wavelength-wavenumber conversion on the reflected interference spectrum and then performs optical path difference analysis based on reverse Fourier transform thereon to determine the intensity distribution for each optical path difference, and computes optical path difference analysis data containing one or two composite interference peaks due to superposition of B-C interference component and C-A interference component; an uncorrected B-C interference distance computation unit which extracts a composite interference peak, containing mainly the B-C interference component signal, as an uncorrected peak from the optical path difference analysis data, and computes the optical path difference of the peak location of the uncorrected peak as uncorrected B-C interference distance; a correction table unit which computes the relationship between the mask thickness of the mask and the amount of offset of optical path difference which is imparted by the C-A interference component to the uncorrected B-C interference distance, and stores it as a correction table; a mask thickness measurement unit which computes mask thickness independently from the uncorrected B-C interference distance computed from reflected interference light containing the aforementioned three interference component signals; a B-C interference distance true value computation unit which computes the amount of offset of the optical path difference based on the mask thickness and the correction table, and computes a corrected B-C interference distance wherein the uncorrected B-C interference distance has been corrected by the amount of offset of the optical path difference; and an etching depth computation unit which computes etching depth based on the corrected B-C interference distance and the mask thickness.

In the present invention, measurement by the spectral interference method is performed when monitoring the etching depth d in the processed region of the substrate (the level difference between the top surface of the substrate and the surface to be etched). To this end, measurement light of a wavelength band capable of generating a spectrum containing A-B interference, B-C interference and C-A interference is projected onto the processed region of the substrate. Extraction of interference component signals excluding the DC component is performed on the reflected interference spectrum (horizontal axis is a wavelength axis) obtained through chromatic dispersion by a spectrometer of the reflected interference light from the processed region of the substrate, and a wavelength-wavenumber converted reflected interference spectrum (horizontal axis is a wavenumber axis) is computed. Then, optical path difference analysis is performed, in which the intensity distribution (horizontal axis—optical path difference; vertical axis—spectral intensity) is determined for each optical path difference by means of a reverse Fourier transform on the reflected interference spectrum (horizontal axis is a wavenumber axis).

Interference peaks corresponding to A-B interference, B-C interference and C-A interference appear at the corresponding locations of optical path difference (horizontal axis is optical path difference) in the optical path difference analysis data determined through optical path difference analysis.

Among these peaks, the B-C interference peak is a peak corresponding to the etching depth d, so it would be good if one could independently extract the B-C interference peak. However, the B-C interference is affected by the C-A interference of small optical path difference and the peaks fuse, thus making it difficult to independently determine the true B-C interference peak from the optical path difference analysis data.

Figure 11:
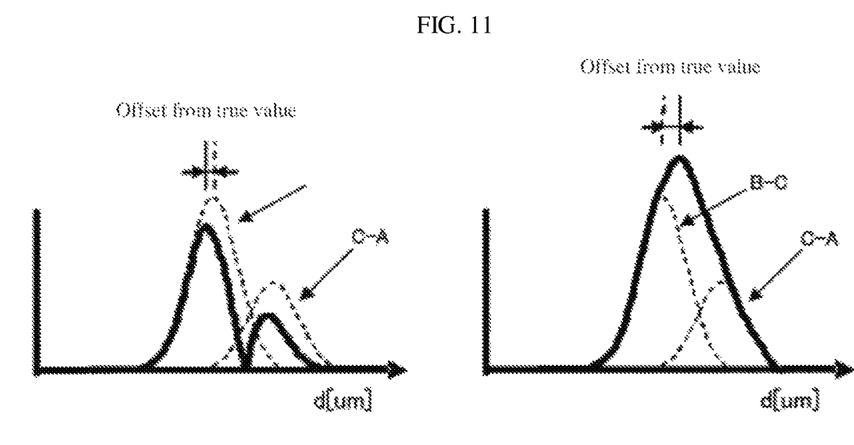
FIG. 11 A schematic in which two Gaussians have been fused by complex amplitude superposition.

Namely, the B-C interference and C-A interference have an optical path difference of nt, where n is the refractive index of the mask material and t is the mask thickness, but since this value is small, and since the two reflected interference lights are superposed as a complex number signal, the peaks of B-C interference and C-A interference do not appear independently but rather form a fused "composite interference peak." Specifically, cases occur where the C-A interference component is mixed into the B-C interference component and a "composite interference peak" consisting of a single peak appears, as well as cases where a "composite interference peak" consisting of two peaks appears—a peak which mainly contains the B-C interference component and a peak which mainly contains the C-A interference component (see FIG. 11, discussed below). It will be noted that the location of the peak due to A-B interference is offset significantly and can thus be clearly distinguished.

Thus, the "composite interference peak" mainly containing the B-C interference component is extracted from the peaks appearing in the optical path difference analysis data and used as the "uncorrected peak."

Namely, in the case of a composite interference peak in which two peaks appear, the peak mainly containing the B-C interference component is taken as the "uncorrected peak," and in cases where one peak appears, that peak is taken as the "uncorrected peak." As will be discussed later, even in cases where two peaks have arisen, the peak to be selected as the "uncorrected peak" can be easily identified as the peak with the larger value and smaller optical path difference, based on the relationship of magnitudes of reflectance difference and optical path difference between the B-C component and C-A component.

The optical path difference (horizontal axis value) corresponding to the peak location of the "uncorrected peak" is a value obtained on the basis of the optical path difference of the peak location assuming the true peak of the B-C interference component alone (the true optical path difference of B-C interference), to which the effect of C-A interference has been added as the "amount of offset of optical path difference" (analytical error). Below, the value of the optical path difference of the peak location of the "uncorrected peak" will be referred to as "uncorrected B-C interference distance."

As will be discussed in detail based on the computation formula described below, if, as a result of finding the analytical error of the optical path difference due to the optical path difference nt between the mask surface a and the substrate top surface b, the ratio between the intensity A of reflected light from the mask surface a and the intensity B of reflected light from the substrate top surface b (the ratio A/B of amplitudes A and B of formulas (1) and (2)) is constant and the refractive index n of the mask material is constant, the amount of offset of the optical path difference can be determined through theoretical calculation, and this value depends on the mask material (refractive index n) and mask thickness t, but does not depend on the etching depth d or the intensity c of reflected light from the surface to be etched (amplitude c of formula (3)).

Thus, the "amount of offset of optical path difference" based on mask thickness t is computed in advance and stored as a correction table, and during etching, the mask thickness t is monitored independently by another means, and the "amount of offset of optical path difference" is computed based on the correction table.

As a method of monitoring the mask thickness t, a well known optical interferometry method can be used, in which a mask thickness measurement light, separate from the measurement light projected onto the processed region of the substrate, is projected onto the mask surface a wherein the substrate top surface b has been coated with a mask. This measurement involves simple interference due only to two surfaces—the substrate top surface b and the mask surface a, which can be simply measured, for example, by a change-over-time monitoring method which has been described as prior art.

By applying the correction table to the independently measured mask thickness t and finding the "amount of offset of optical path difference" from the true peak location of B-C interference to correct the "uncorrected B-C interference distance," the true interference distance corresponding to B-C interference alone can be found. The corrected value will be referred to hereinafter as "corrected B-C interference distance."

The etching depth d can then be uniquely determined based on the optical relationship between the "corrected B-C interference distance" and the mask thickness t.

In this way, so long as the mask material (i.e. the index of refraction n) is the same, by preparing a correction table in advance, regardless of the etching amount (etching time) or etching speed, it becomes possible to determine the amount of correction for the "uncorrected B-C interference distance" determined based on the measurement light from the processed region of the substrate, simply by monitoring the mask thickness t. As a result, it becomes possible to determine the "corrected B-C interference distance," which is the accurate B-C interference distance, using a single correction table, thus making it possible to accurately determine the etching depth (the distance between the top surface of the substrate and the surface to be etched).

According to the present invention, ambiguity due to the presence of a mask such as a photoresist when measuring etching depth can be eliminated, making it possible to measure etching depth with high precision.

Furthermore, if the mask material is the same, and the processed substrate and measurement light source are the same, then a single correction table can be used regardless of the etching speed and etching selection ratio, making possible superior etching monitoring with high precision in cases where the same processing is performed repeatedly and the like.

A mode of embodiment of the present invention will be described below. First, the interference phenomenon in the present invention will be described.

<Specific Example of Optical Path Difference Analysis Data of Reflected Interference Spectrum>

Figure 10:
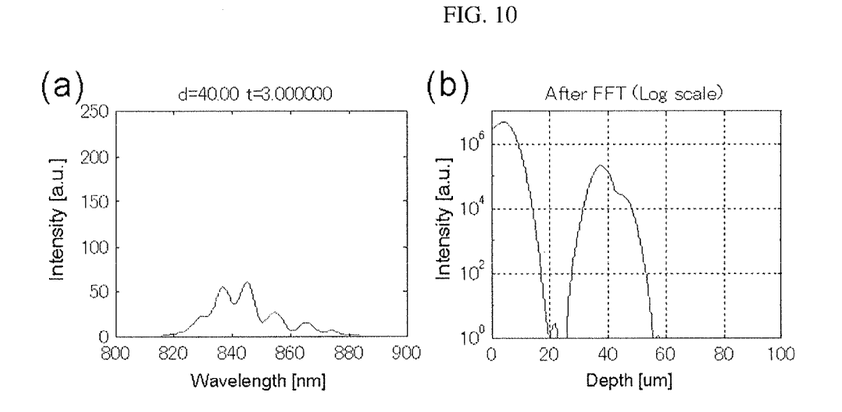
FIG. 10 A drawing of the spectrum of two reflected interference lights when measuring the processed region of a substrate using a light source having a spectrum centered on a wavelength of 850 nm and having a wavelength band of 15 nm full width at half maximum.

FIG. 10 shows a reflected interference spectrum example when the etching depth d is 40.00 μm and the mask thickness is 3.00 μm, and an example of optical path difference analysis data which is the result of optical path difference analysis through reverse Fourier transform of said spectrum.

The spectrum of FIG. 10 (a) assumes a Gaussian spectrum with a central wavelength of 850 nm and a light source band of 20 nm, and is the result of calculating the reflected interference spectrum (horizontal axis: wavelength) from the processed region of the substrate shown in FIG. 3 based on formula (4). Although illustration of this has been omitted, normalization to remove the direct current component is performed on this reflected interference spectrum to extract the interference component signal, and a reflected interference spectrum (horizontal axis: wavenumber axis) is computed with conversion to wavenumber axis through wavelength-wavenumber conversion in order to handle the cos wave linearly.

Furthermore, reverse Fourier transform (hereinafter referred to as RFT) is performed to compute optical path difference analysis data based on a reverse Fourier transformed signal (RFT signal) showing the intensity distribution for each optical path difference, shown in FIG. (b). The RFT signal does not have a Gaussian shape but rather a shape of two fused Gaussians. This is the result of fusion by complex amplitude superposition of B-C interference, for which the optical path difference peak location is 2(d+t−nt) (μm), and C-A interference, for which the peak location is 2(d+t) (μm), assuming an etching depth d, mask thickness t and mask index of refraction n (FIG. 3). The fused peak location (the location showing the maximum value of the signal) does not show either 2(d+t−nt) (μm) or 2(d+t) (μm).

FIG. 11 shows a schematic in which two Gaussians have been fused through complex amplitude superposition. As is clear from FIG. 3, B-C interference has a shorter interference distance compared to C-A interference, and the reflectance of the substrate top surface b (mask/substrate interface) is higher than that of the mask surface a, so in the graph of FIG. 11 after RFT-based optical path difference analysis, the B-C interference appears with a relatively large intensity on the left side, and C-A interference appears with a relatively small intensity on the right side. Here, the B-C interference and C-A interference components form a complex amplitude superposition, so there are cases where they will weaken each other and the B-C interference peak location will be detected to the shorter distance side from the proper location, as shown in FIG. 11 (a), and also cases where they will strengthen each other and the B-C interference peak location will appear to the longer distance side from the proper location, as shown in FIG. 11 (b), and the mask thickness t repeatedly alternates between the two states with a period that is half the measurement wavelength (since the optical path length is round-trip). Since these two peaks are not a simple superposition of intensities but rather a complex amplitude superposition, they cannot be separated using normal peak separation methods, and when monitoring the etching depth through optical path difference analysis of spectral interference fringes, this produces an error on the order of several microns, causing a serious problem.

Figure 12:
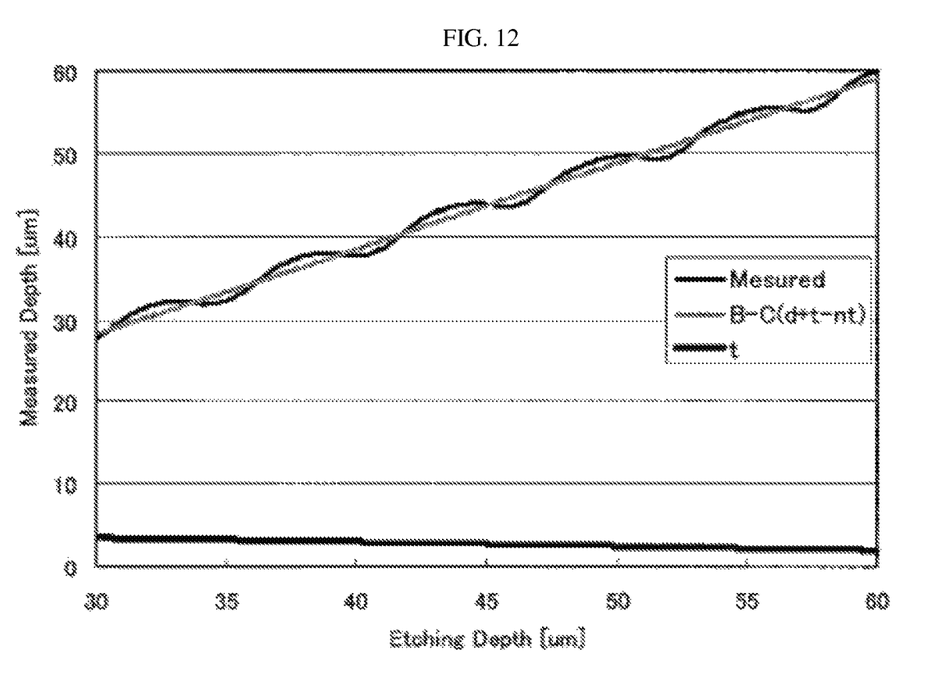
FIG. 12 A graph in which the peak location of B-C interference has been plotted against etching depth d (optical path difference).

FIG. 12 shows a graph in which the B-C interference peak location has been plotted against etching depth d. In the graph of optical path difference analysis data discussed above, the peak location of (etching) depth measurement fluctuates in relation to the actual peak location (the true peak location for B-C interference alone) as a result.

<Quantitative Analysis of Offset of Optical Path Difference>

In this connection, the quantitative estimation of the amount of offset of the measured (etching) depth peak location in relation to the true peak location will be examined. For the signal intensity I of the three summed light waves A, B and C, the spectral shape of the light source is assumed to be a Gaussian of width σ.

Using formula (4), this can then be expressed as formula (11a).

(Mathematical formula 1)

$$I(\lambda) = e^{-\frac{(\frac{1}{\lambda}-\frac{1}{\lambda_c})^2}{\sigma^2}} \left[ A^2 + B^2 + C^2 + 2AB\cos\left(2nt\frac{1}{\lambda}2\pi\right) + 2BC\cos\left(2(t+d-nt)\frac{1}{\lambda}2\pi\right) + 2CA\cos\left(2(t+d)\frac{1}{\lambda}2\pi\right) \right] \quad (11a)$$

Here, in order to linearly plot the x axis of the cos wave, the wavelength λ axis is converted to wavenumber ω (=1/λ axis), yielding formula (11b).

(Mathematical formula 2)

$$I(\omega) = e^{-\frac{(\omega-\omega_c)^2}{\sigma^2}} [A^2 + B^2 + C^2 + 2AB\cos(2nt\omega 2\pi) + 2BC\cos(2(t+d-nt)\omega 2\pi) + 2CA\cos(2(t+d)\omega 2\pi)] \quad (11b)$$

To consider just the interference component, excluding the DC bias (normalization), the acquired spectrum s (ω) takes on the form of formula (12).

(Mathematical formula 3)

$$s(\omega) = \quad (12)$$
$$2AB\cos(2nt\omega 2\pi)e^{-\frac{(\omega-\omega_c)^2}{\sigma^2}} + 2BC\cos(2(t+d-nt)\omega 2\pi)e^{-\frac{(\omega-\omega_c)^2}{\sigma^2}} + 2CA\cos(2(t+d)\omega 2\pi)e^{-\frac{(\omega-\omega_c)^2}{\sigma^2}}$$

The reverse Fourier transform S (x) of formula (12) will be considered. First, the reverse Fourier transform of P cos (Lω2π) exp {−a (ω−ωc)²} takes the form of formula (13).

(Mathematical formula 4)

$$\int_{-\infty}^{\infty} P\cos(L(\omega-\omega_c)2\pi + 2\pi L\omega_c)e^{-a(\omega-\omega_c)^2}e^{-12\pi\omega x}d\omega = \quad (13)$$
$$\frac{P}{2}\sqrt{\frac{\pi}{a}}e^{-\frac{\pi^2}{a}(x-L)^2}e^{-12\pi\omega_c(x-L)}$$

The Gaussian of band σ, based on formula (13), is $a=1/\sigma^2$, so reverse Fourier transform $S(x)$ of interference signal $s(\omega)$ takes the form of formula (14).

(Mathematical formula 5)

$$S(x)=\sqrt{\pi}\sigma[ABe^{-\pi^2\sigma^2(x-2nt)^2}e^{-i2\pi\omega_c(x-2nt)}+BCe^{-\pi^2\sigma^2[x-2(t+d-nt)]^2}e^{-i2\pi\omega_c[x-2(t+d-nt)]}+CAe^{-\pi^2\sigma^2[x-2(t+d)]^2}e^{-i2\pi\omega_c[x-2(t+d)]}] \quad (14)$$

Figure 13:
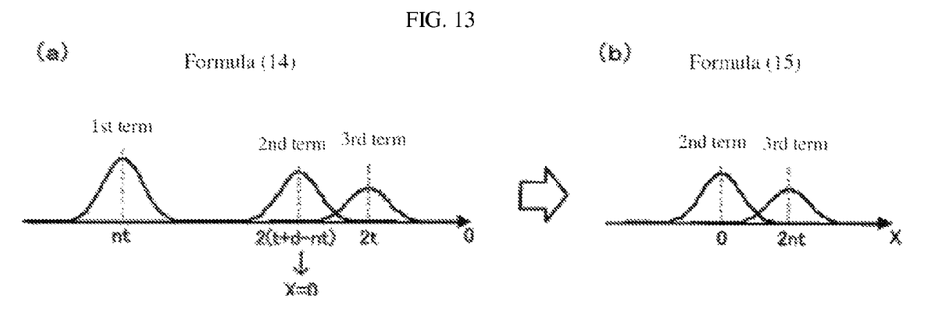
FIG. 13 A drawing showing the intensity distribution f(X) with coordinate conversion of the detected maximum peak location x to the amount of offset $X=x-2(t+d-nt)$ between the true value and x.

Here, when etching has progressed substantially and the etching depth d has become substantially greater than the mask thickness t, i.e. when $2nt \ll d$, when coordinate conversion of the detected maximum peak location x into the amount of offset $X=x-2(t+d-nt)$ between the true value and x is performed, as shown in FIG. 13, in the vicinity of $X=0$, the first term can be considered to be zero and can thus be omitted, and considering only the second term and third term of formula (3), the intensity distribution $f(X)$ thereof is given by formula (15).

(Mathematical formula 6)

$$f(X)=|\sqrt{\pi}\sigma[BCe^{-\pi^2\sigma^2X^2}e^{-i2\pi\omega_c X}+CAe^{-\pi^2\sigma^2(X-2nt)^2}e^{-i2\pi\omega_c(X-2nt)}]|^2=\pi\sigma^2[B^2C^2e^{-2\pi^2\sigma^2X^2}+C^2A^2e^{-2\pi^2\sigma^2(X-2nt)^2}+2BCe^{-\pi^2\sigma^2(X-2nt)^2}+2CAe^{-\pi^2\sigma^2X^2}e^{-\pi^2\sigma^2(X-2nt)^2}\cos(2nt\omega_c 2\pi)] \quad (15)$$

The maximum peak location $X_1$ of $f(X)$, based on the derivation $$\frac{df(X)}{dX}=0$$

of formula (15), is the solution of formula (16).

(Mathematical formula 7)

$$B^2X_1e^{-2\pi^2\sigma^2X_1^2}+A^2(X_1-2nt)e^{-2\pi^2\sigma^2(X_1-2nt)^2}+2BA(X_1-nt)e^{-\pi^2\sigma^2X_1^2}e^{-\pi^2\sigma^2(X_1-2nt)^2}\cos(2nt\omega_c 2\pi)=0 \quad (16)$$

From formula (16), it can be seen that $X_1$, i.e. the amount of offset from the true value, depends only on the mask thickness t, the mask material (index of refraction n and reflectances A and B) and the band σ of the light source (or the spectral shape of the light source), and does not depend on the etching depth d or the reflected light quantity C from the material to be etched.

Therefore, using the solution of formula (16) as a correction value, it is possible to obtain the true solution (the corrected B-C interference distance) by correcting the spectral interference fringes in which B-C interference and C-A interference are mixed, with the aforementioned correction value, on the basis of the peak location in the optical path difference analysis results obtained through reverse Fourier transform (RFT).

Figure 14:
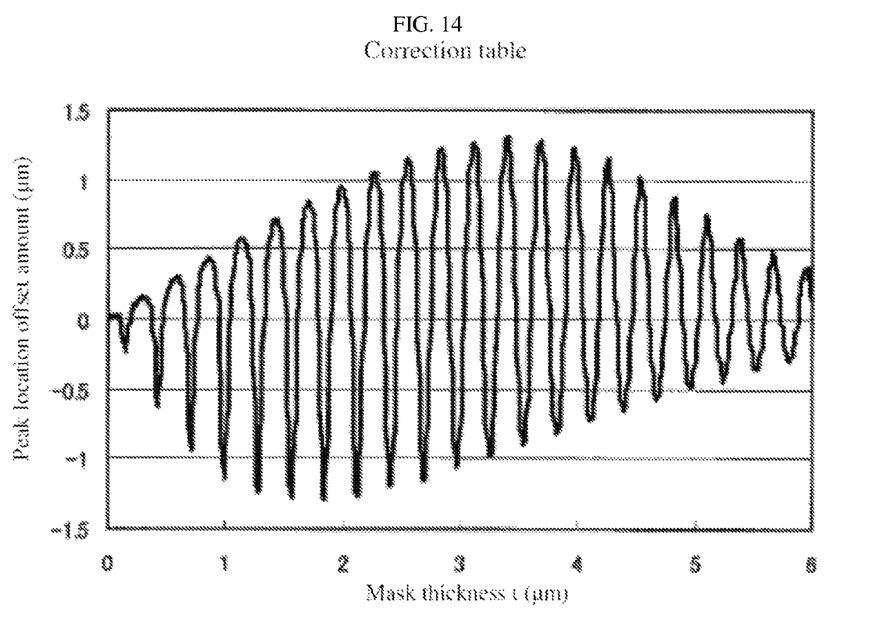
FIG. 14 A drawing illustrating an example of a correction table of correction values $X_1$ for mask thickness t.

However, it is difficult to solve formula (16) analytically, so rather than using a correction formula, the true solution is found by applying a table of correction values $X_1$ vs. mask thickness, obtained as a result of calculating numerical solutions on the basis of measured light source spectra, as shown in FIG. 14, to the optical path difference analysis result.

Based on the optical relationship shown in FIG. 3, the corrected B-C interference distance d', which is the computed true solution, will be $$d'=2(d+t-nt) \quad (17),$$

and thus the etching depth d can be found from the corrected B-C interference distance d' and the mask thickness t by calculating $$d=d'/2-t+nt \quad (18)$$

<Device Configuration>

Next, an example of the device configuration of the etching monitor of the present invention employing the above operating principle will be described.

Figure 1:
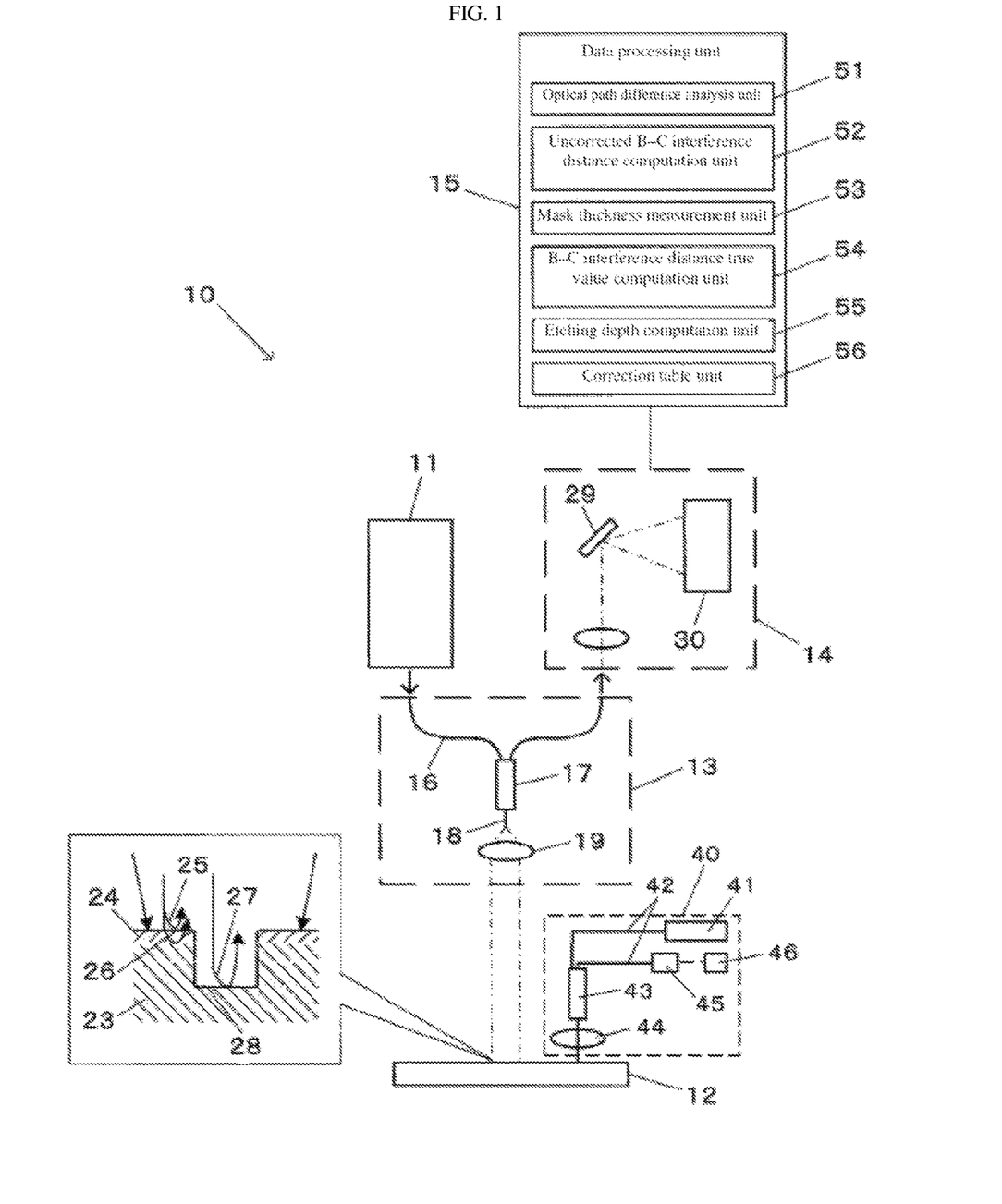
FIG. 1 A drawing illustrating the configuration of an etching monitor device constituting a mode of embodiment of the present invention.

FIG. 1 is a simplified diagram of an etching monitor device constituting a mode of embodiment of the present invention. This etching monitor device 10 is a device which monitors a distance that changes moment to moment, such as the depth of a trench that is formed on a specimen 12 being etched by a plasma etching device. The etching monitor device 10 comprises a light source 11, a measurement optical system 13, a spectrometric unit 14 and a data processing unit 15. The light source 11 and measurement optical system 13 and the measurement optical system 13 and spectrometric unit 14 are connected by an optical fiber 16.

As the light source 11, which should have a band capable of producing a reflected interference spectrum, one can use, for example, a superluminescent diode (SLD) with a central wavelength of 830 nm and a full width at half maximum of 30 nm, or another light source having about the same wavelength bandwidth. The measurement light emitted from the light source 11 is taken up into light input side optical fiber 16, proceeds via fiber coupler 17 through optical fiber 18, and is outputted into space from the end of optical fiber 18. The measurement light outputted from the end of optical fiber 18 is projected via collimator lens 19 onto the specimen 12.

The state of interference in the processed region of the substrate of specimen 12 will be explained using the enlarged drawing within the same drawing. When trench depth is measured during etching, interference occurs between reflected light 25 from the top surface of resist layer 24 (mask surface) on the top surface of substrate 23, reflected light 26 from the top surface of substrate 23 due to light which has entered into the resist layer 24, and reflected light 27 from the bottom surface of trench hole 28 (the surface to be etched). These three reflected lights 25 through 27 travel back through the collimator lens 19 in the opposite direction to the projection of light and enter optical fiber 18. They then pass through fiber coupler 17 and arrive at spectrometric unit 14. The reflected lights thoroughly interfere while passing through optical fiber 18 before they reach the spectrometric unit 14, forming interference light.

In the spectrometric unit 14, interference light is chromatically dispersed by a spectrometric means such as diffraction grating 29, and light of a predetermined wavelength band is simultaneously detected by an array detector 30 of CCD line sensors or the like. Detection signals corresponding to each wavelength from the array detector 30 are inputted into data processing unit 15.

Furthermore, a mask measurement unit 40 is provided for optically measuring the thickness of the resist layer 24 (the mask thickness) in the region where only resist layer 24 has been formed on substrate 23. This mask measurement unit 40 comprises, for example, a light source 41, optical fiber 42, fiber coupler 43, collimator lens 44, spectrometer 45 and detector 46, and performs interference measurement based on the time monitoring method. Namely, measurement light of a single wavelength is projected from light source 41, and measurement light reflected from substrate 23 and resist layer 24 (mask surface) is detected by detector 46 and inputted into data processing unit 15.

It will be noted that the optical measurement of mask thickness by the mask measurement unit 40 is not limited hereto, and may also be measurement based on the spectral reflection method. Specifically, for example, a mask film thickness measurement technique based on the spectral reflection method as described in Patent Literature 3 (Japanese Unexamined Patent Application Publication 2000-292129) may be used.

Data processing unit 15 consists of a personal computer, and carries out its computation functions as data processing unit 15 by executing preinstalled data processing software.

To describe the computation processing executed by data processing unit 15 in terms of function blocks, the data processing unit 15 comprises an optical path difference analysis unit 51, uncorrected B-C interference distance computation unit 52, mask thickness measurement unit 53, B-C interference distance true value computation unit 54, etching depth computation unit 55 and correction table unit 56.

Optical path difference analysis unit 51 performs operations to extract interference component signals excluding the DC component from the reflected interference spectrum, performs wavelength-wavenumber conversion, and then performs optical path difference analysis through reverse Fourier conversion to find the intensity distribution for each optical path difference, and computes the optical path difference analysis data containing one or two complex interference peaks formed through superposition of the B-C interference component and C-A interference component (formulas (11a) through (14)).

Uncorrected B-C interference distance computation unit 52 extracts the complex interference peak containing mainly the B-C interference component signal as the "uncorrected peak" from the computed optical path difference analysis data, and finds the optical path difference of the peak location of the uncorrected peak as the "uncorrected B-C interference distance."

Correction table unit 56 computes the relationship between the mask thickness and the "amount of offset of optical path difference" imparted by the C-A interference component to the "uncorrected B-C interference distance" in advance as a numerical value solution using formula (16), and stores the results in memory of data processing unit 15 as a correction table. It will be noted that, for cases where the mask material has been changed, one may store the formula (16) and enable computation of numerical solutions upon input of the mask's index of refraction n, reflectances A and B and light source wavelength band σ to update the correction table.

Mask thickness measurement unit 53 performs operations to optically compute the mask thickness based on the detection signal from mask measurement unit 40.

B-C interference distance true value computation unit 54 performs operations to compute the "amount of offset of optical path difference" based on the mask thickness computed by the mask thickness measurement unit 53 and the stored correction table, and to compute the "corrected B-C interference distance" by correcting the "uncorrected B-C interference distance" by the "amount of offset of optical path difference."

Etching depth computation unit 55 performs operations to compute etching depth by means of formula (18) based on "corrected B-C interference distance" and mask thickness.

Figure 2:
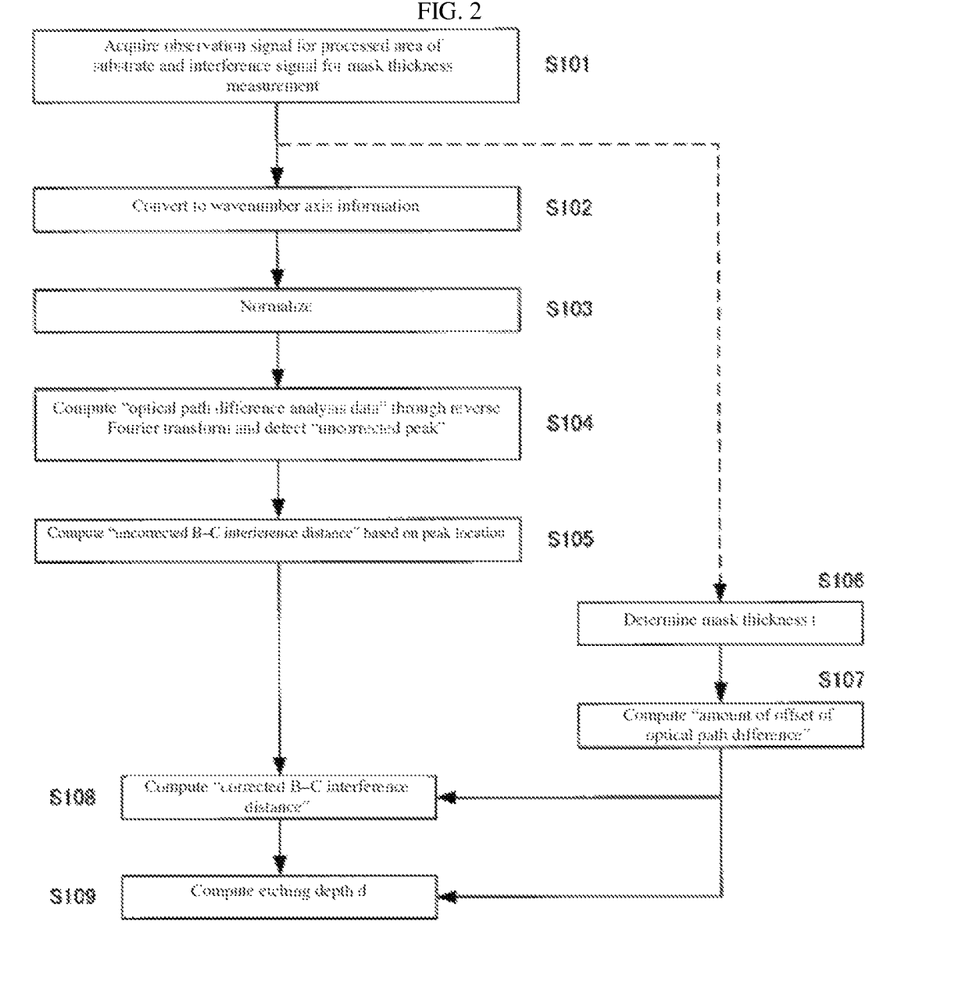
FIG. 2 A flow chart explaining the monitoring operation of the device of FIG. 1.

Next, the measurement operation of the etching monitor device 10 will be described while referring to the flow chart of FIG. 2.

When measurement of trench depth is initiated along with the start of etching, the data processing unit 15 acquires an observation signal at predetermined time points (S101). Specifically, processing is performed to acquire spectral data across a predetermined wavelength range in array detector 30 of spectrometric unit 14. At the same time, processing is performed to acquire an interference signal for measurement of resist film thickness (mask thickness) from mask measurement unit 40.

Spectral data (horizontal axis is wavelength axis) as shown in FIG. 8 (a) is obtained from the acquired observation signal, and this is converted (corresponding to formula (11b)) to wavenumber axis (S102).

Next, normalization (corresponding to formula (12)) is performed, in which the DC bias spectrum is subtracted and only the interference component signal is extracted (S103).

Next, reverse Fourier transform (RFT; corresponding to formula (14)) is performed on the normalized spectral data which has been converted to wavenumber axis. Optical path difference analysis data (horizontal axis is optical path difference) as shown in FIG. 8 (d) is obtained as a result (S104).

After RFT, detection of the maximum value peak location is performed on the peak signal appearing in the graph of optical path difference analysis data using a technique such as Gaussian fitting (S105). Here, if the peak is separated into two, as shown in FIG. 9 (a), the peak signal on the left side (short distance side) is taken as the object of detection, but since the left peak is usually of relatively greater intensity, the location of the maximum value can be detected both in cases where there is one peak and where there are two peaks.

Here, by detecting the peak location, an "uncorrected peak" containing mainly the B-C interference component signal is extracted. Then, the "uncorrected B-C interference distance" is determined based on the horizontal axis of "uncorrected peak location."

Furthermore, mask thickness t is measured separately from the "uncorrected peak" by means of the signal from the mask measurement unit 40 (S106).

Then, the "amount of offset of optical path difference" due to fusion of C-A interference is computed using the correction table (FIG. 14) that was stored in advance and the mask thickness t (S107).

Subsequently, the "uncorrected B-C interference distance" is corrected by the "amount of offset of optical path difference" to compute the "corrected B-C interference distance d'," which is the true value of B-C interference distance (S108).

Subsequently, the etching depth d is computed by means of formula (18) using the "corrected B-C interference distance d'" (S109).

Based on the foregoing processing, accurate measurement of etching depth can be accomplished even when beat-like changes occur due to the presence of a mask region.

(Field of industrial application) The present invention can be applied to etching monitor devices.

EXPLANATION OF REFERENCES

10 Etching monitor device
11 Superluminescent diode (light source)
13 Measurement optical system
14 Spectrometric unit
15 Data processing unit
23 Substrate
24 Resist layer (mask)
25, 26, 27 Reflected light
28 Trench hole bottom surface (etched surface)
51 Optical path difference analysis unit
52 Uncorrected B-C interference distance computation unit
53 Mask thickness measurement unit 54 B-C interference distance true value computation unit
55 Etching depth computation unit
56 Correction table unit

What is claimed is:

1. An etching monitor device which monitors etching depth, the etching depth being a level difference between a surface to be etched and a top surface of a substrate in a processed region of the substrate, the top surface of the substrate being covered with a mask, and the surface to be etched not being covered by the mask, the device comprising:
   a light source which generates measurement light having a predetermined wavelength band;
   a measurement optical system which projects said measurement light onto said processed region of the substrate, and acquires reflected interference light containing three interference component signals which are due respectively to optical path differences of reflected light between three sets of surfaces, the three interference component signals including a first interference component based on an optical path difference between light reflected off of a top surface of the mask and light reflected off of the top surface of the substrate, a second interference component based on an optical path difference between light reflected off of the top surface of the substrate and light reflected off of a surface to be etched, and a third interference component based on an optical path between the light reflected off of the surface to be etched and the light reflected off of the mask surface;
   a spectrometric unit which disperses a wavelength of said reflected interference light and detects a reflected interference spectrum;
   an optical path difference analysis unit which performs extraction of the interference component signals, performs wavelength-wavenumber conversion on said reflected interference spectrum, performs optical path difference analysis based on reverse Fourier transform thereon to determine an intensity distribution for each optical path difference, and computes optical path difference analysis data containing one or two composite interference peaks due to superposition of the second interference component and the third interference component;
   an uncorrected second component interference distance computation unit which extracts a composite interference peak, containing mainly the second interference component signal, as an uncorrected peak from the optical path difference analysis data, and computes the optical path difference of a peak location of the uncorrected peak as an uncorrected second interference distance;
   a mask thickness measurement unit which computes a mask thickness independently from the uncorrected second interference distance computed from reflected interference light containing the three interference component signals;
   a correction table unit which stores a computed relationship between the mask thickness of said mask and the amount of offset of optical path difference which is imparted by said third interference component to said uncorrected second interference distance a correction table;
   a second interference distance true value computation unit which computes the amount of offset of said optical path difference based on said mask thickness and said correction table, and computes a corrected second interference distance wherein said uncorrected second interference distance is corrected by the amount of offset of the optical path difference; and
   an etching depth computation unit which computes the etching depth based on said corrected second interference distance and said mask thickness.

2. The etching monitor device as described in claim 1, wherein said mask thickness measurement unit measures mask thickness by performing interference measurement of a measurement light projected onto a region of only two reflecting surfaces, a mask surface and a substrate top surface.

3. A method for monitoring an etching depth, the etching depth being a level difference between a surface to be etched and a top surface of a substrate in a processed region of the substrate, the top surface of the substrate being covered with a mask, and the surface to be etched not being covered by the mask, the method comprising:
   generating measurement light having a predetermined wavelength band;
   projecting said measurement light onto said processed region of the substrate, and acquiring reflected interference light containing three interference component signals which are due respectively to optical path differences of reflected light between three sets of surfaces, the three interference component signals including a first interference component based on an optical path difference between light reflected off of a top surface of the mask and light reflected off of the top surface of the substrate, a second interference component based on an optical path difference between light reflected off of the top surface of the substrate and light reflected off of a surface to be etched, and a third interference component based on an optical path between the light reflected off of the surface to be etched and the light reflected off of the mask surface;
   dispersing a wavelength of said reflected interference light and detecting a reflected interference spectrum;
   performing extraction of the interference component signals, performing wavelength-wavenumber conversion on said reflected interference spectrum, performing optical path difference analysis based on reverse Fourier transform thereon to determine an intensity distribution for each optical path difference, and computing optical path difference analysis data containing one or two composite interference peaks due to superposition of the second interference component and the third interference component;
   extracting a composite interference peak, containing mainly the second interference component signal, as an uncorrected peak from the optical path difference analysis data, and computes the optical path difference of a peak location of the uncorrected peak as an uncorrected second interference distance;
   computing a mask thickness independently from the uncorrected second interference distance computed from reflected interference light containing the three interference component signals;
   computing an amount of offset of said optical path difference based on said mask thickness and a correction table, and computing a corrected second interference distance wherein said uncorrected second interference distance is corrected by the amount of offset of the optical path difference, the correction table indicating a relationship between the mask thickness of said mask and the amount of offset of optical path difference which is imparted by said third interference component to said uncorrected second interference distance; and
   computing the etching depth based on said corrected second interference distance and said mask thickness.

4. The method for monitoring the etching depth as described in claim 3, wherein the mask thickness is measured by performing interference measurement of a measurement light projected onto a region of only two reflecting surfaces, a mask surface and a substrate top surface.

* * * * *